April 30, 1968     Q. E. GUALTIER     3,380,118

APPARATUS FOR MAKING COMPOSITE ARTICLES

Filed July 1, 1965     10 Sheets-Sheet 1

INVENTOR:
QUENTIN E. GUALTIER
BY
Breitenfeld & Levine
ATTORNEYS

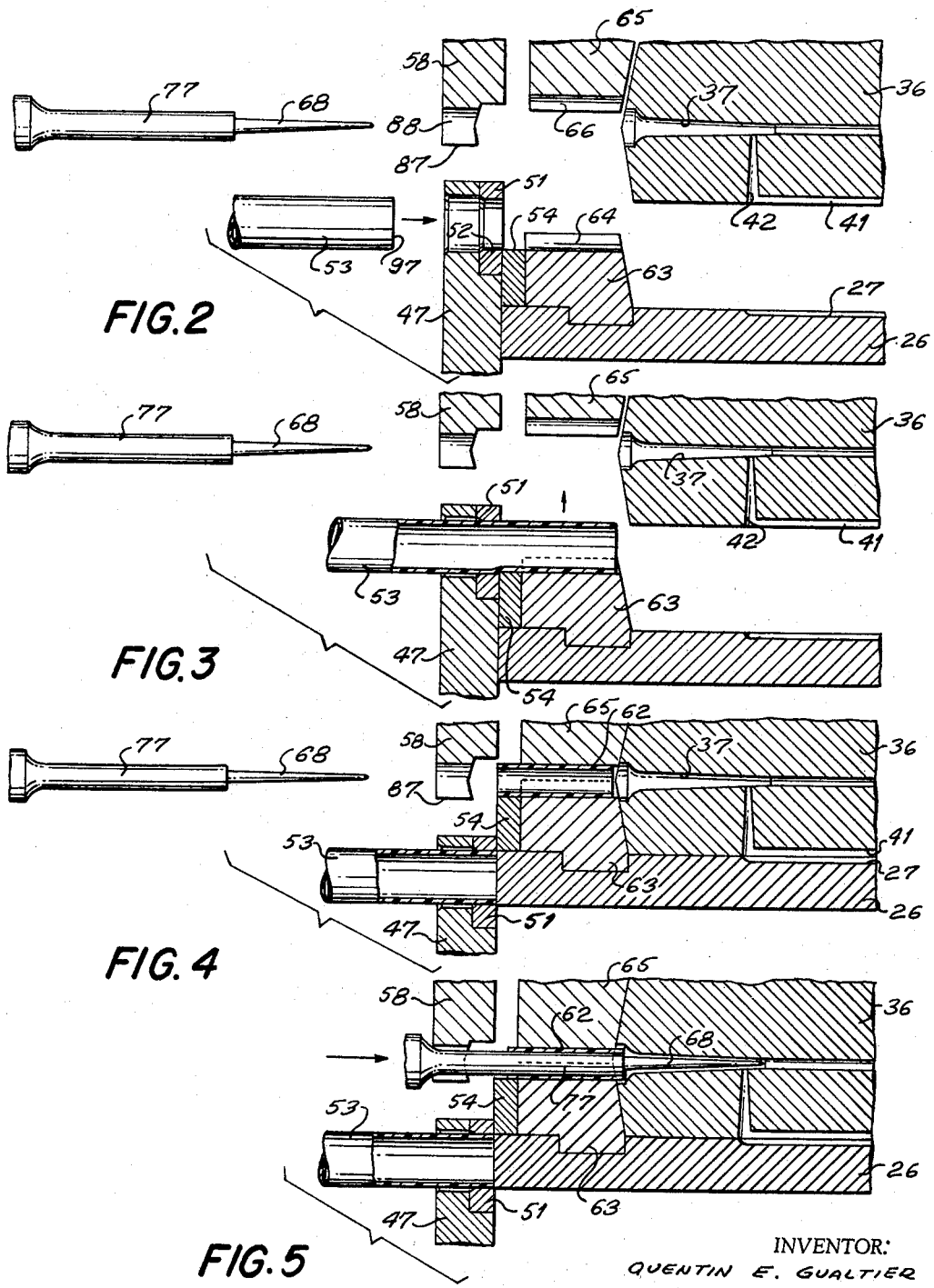

INVENTOR:
QUENTIN E. GUALTIER
BY
Breitenfeld & Levine
ATTORNEYS

April 30, 1968   Q. E. GUALTIER   3,380,118
APPARATUS FOR MAKING COMPOSITE ARTICLES
Filed July 1, 1965   10 Sheets-Sheet 6

INVENTOR:
QUENTIN E. GUALTIER
BY
Breitenfeld & Levine
ATTORNEYS

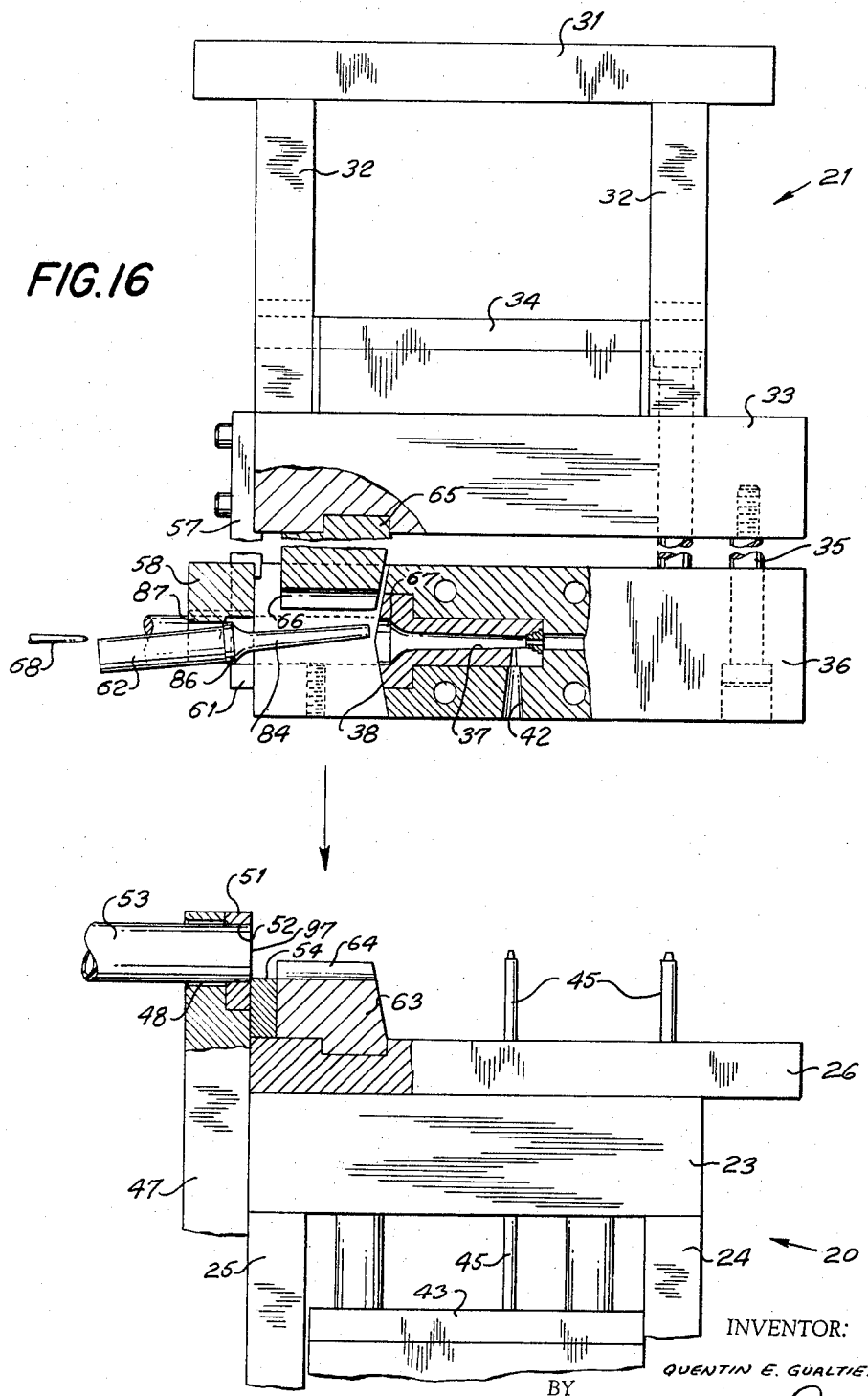

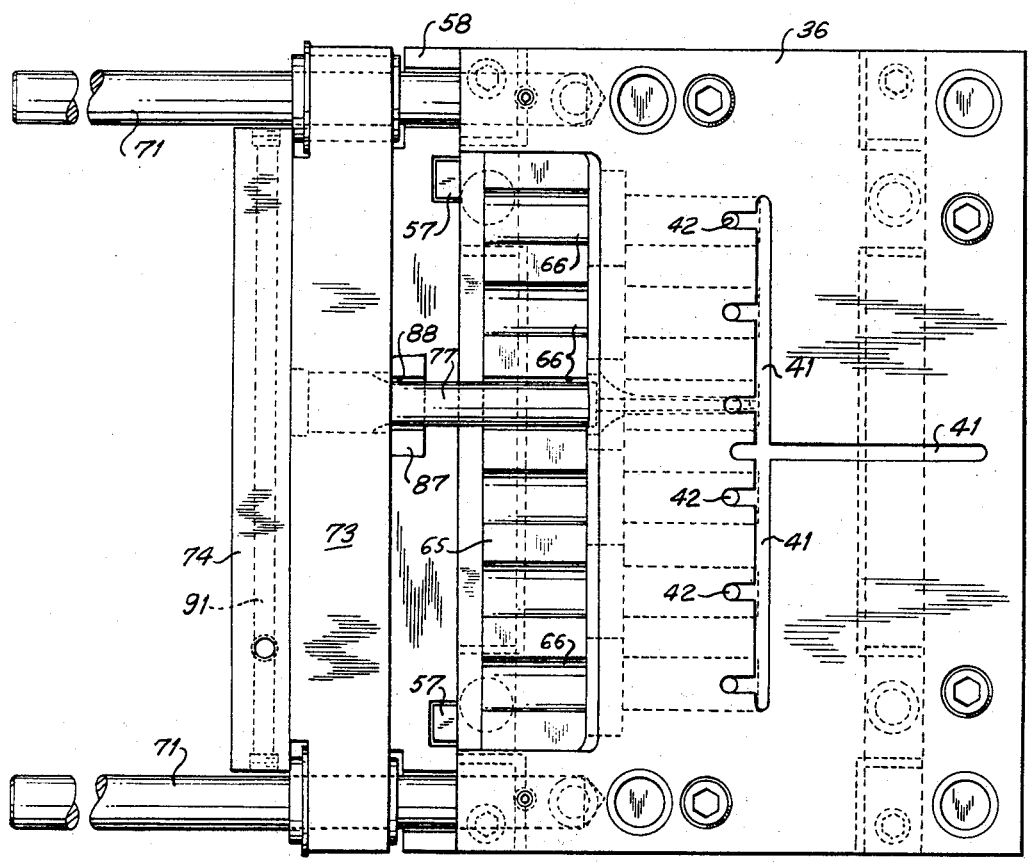

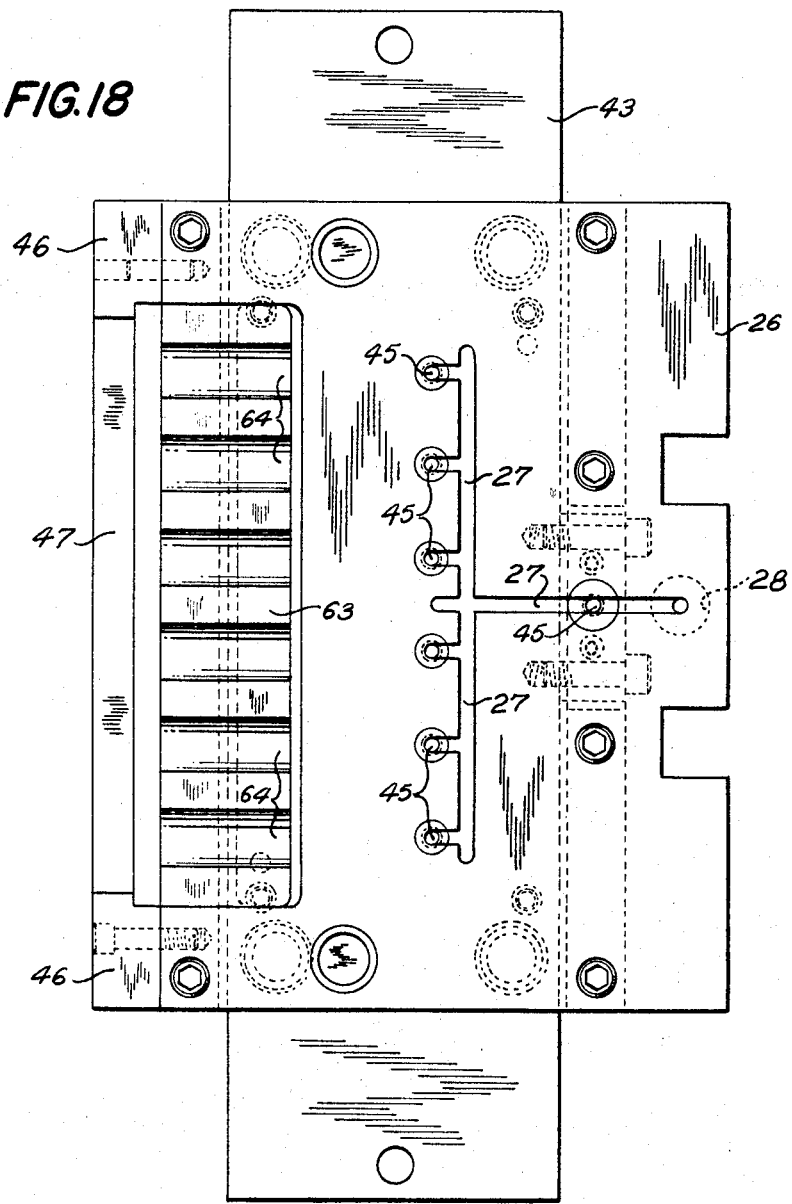

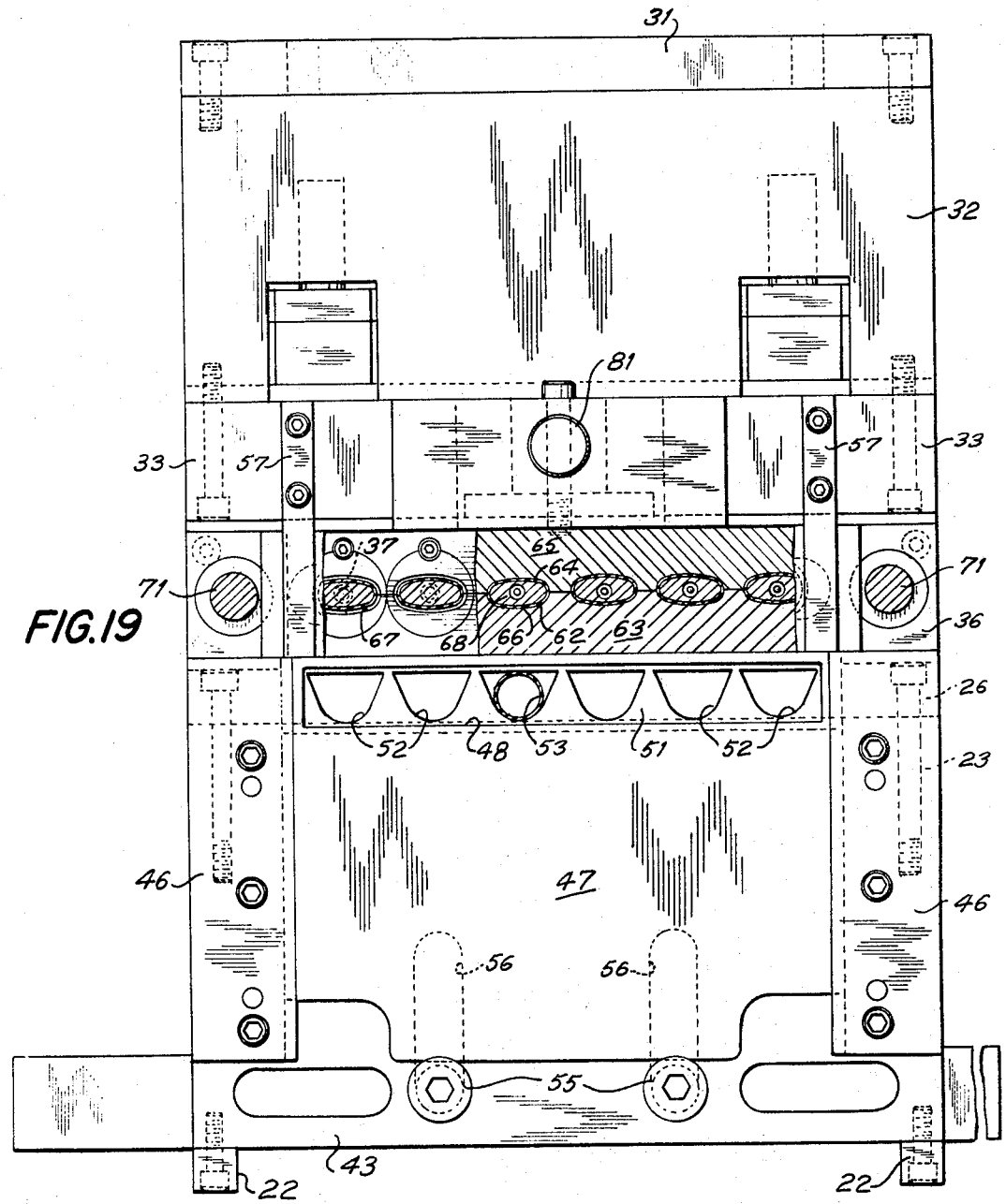

United States Patent Office 3,380,118
Patented Apr. 30, 1968

3,380,118
APPARATUS FOR MAKING
COMPOSITE ARTICLES
Quentin E. Gualtier, Bloomfield, N.J., assignor to Rapid Tool & Manufacturing Company, Inc., Newark, N.J., a corporation of New Jersey
Filed July 1, 1965, Ser. No. 468,724
11 Claims. (Cl. 18—30)

ABSTRACT OF THE DISCLOSURE

Two-part mold defines cavity for container cap. Means advance a continuous length of tubing to mouth of cavity, and mold parts close. Tubing is cut at point spaced from cavity mouth to produce an individual tube, and a core moves through cut end of tube into cavity, just prior to injection of molten plastic into cavity.

---

This invention relates to an apparatus for making articles whose component parts are formed at different times, and more particularly to an apparatus for providing one end of a preformed elongated body with a molded plastic head.

The invention will be illustrated in connection with a plastic tubular container having an injection molded cap at one end. An example of such containers are the flexible-walled squeeze bottles or tubes in common use for packaging fluid and semi-fluid materials such as pharmaceuticals, shampoo, and cosmetics.

At the present time, containers of the type mentioned are produced by providing a supply of individual tubes generally formed by cutting up a continuous length of extruded tubing. These precut tubes are placed by hand on to cores carried by an indexing table of a molding apparatus. The filled cores are indexed to a cavity in which they are "headed," i.e. provided with a molded cap at one end. The practice of manually loading the molding apparatus with precut tubes is undesirable since it limits the speed of operation of the molding apparatus, and introduces a substantial cost factor into the production of these containers. In the past, various attempts have been made to automate the feeding of precut tubes to the mold cavities by means of hoppers and magazines. However, these attempts have consistenly failed, primarily because the thin-walled flexible tubes do not have sufficient rigidity to permit reliable feeding by mechanical means.

It is an object of the present invention to provide an apparatus for mechanically feeding tubular material to a mold wherein it is headed, without encountering the problems inherent in feeding precut lengths of tubing.

It is another object of the invention to provide an apparatus for producing containers of the type described by feeding tubular material in the form of a continuous length to a mold cavity, and cutting off a predetermined length of tubing just prior to the heading operation.

It is a further object of the invention to provide an apparatus for producing such containers wherein the means for cutting the tubular material forms part of the molding apparatus and is actuated during the normal operation of the molding apparatus.

It is still another object of the invention to provide an apparatus for producing such containers wherein a core is automatically inserted into the newly cut tube just prior to the heading operation.

It is yet another object of the invention to provide such an apparatus which can be mounted on and operated by a substantially standard molding machine.

According to the invention, as illustrated herein, a continuous length of tubing is intermittently advanced, from a supply reel or even directly from the extruding apparatus, to bring its free end to the mouth of a mold cavity. The molding apparatus is then closed, and during this closing movement, a cutting member mounted on the apparatus is actuated to cut off a predetermined length of the tubing to produce an independent tube having one of its ends at the mouth of the mold cavity. A core is then inserted through the tube and into the mold cavity, whereupon molten plastic material is injected into the cavity to form a cap at one end of the tube. The core is then withdrawn from the cavity, carrying the headed tube with it, and during this withdrawing movement the tube is stripped from the core. Thereafter, the cutting member is reset and the next advancement of the continuous length of tubing takes place.

Additional objects and advantages of the invention will be apparent from the following detailed description in which reference is made to the accompanying drawings.

In the drawings:

FIGS. 2–8 are vertical cross-sectional views showing the sequence of operation of the apparatus;

FIG. 16 is a view similar to FIG. 13 at still another stage of operation;

FIG. 17 is a view along line 17—17 of FIG. 14 showing the underface of the cavity plate;

FIG. 18 is a view along line 18—18 of FIG. 14 showing the upper face of the runner plate; and FIG. 19 is a front elevational view of the apparatus, with certain parts removed, looking in the direction of the arrows 19—19 of FIG. 14.

Figure 1:
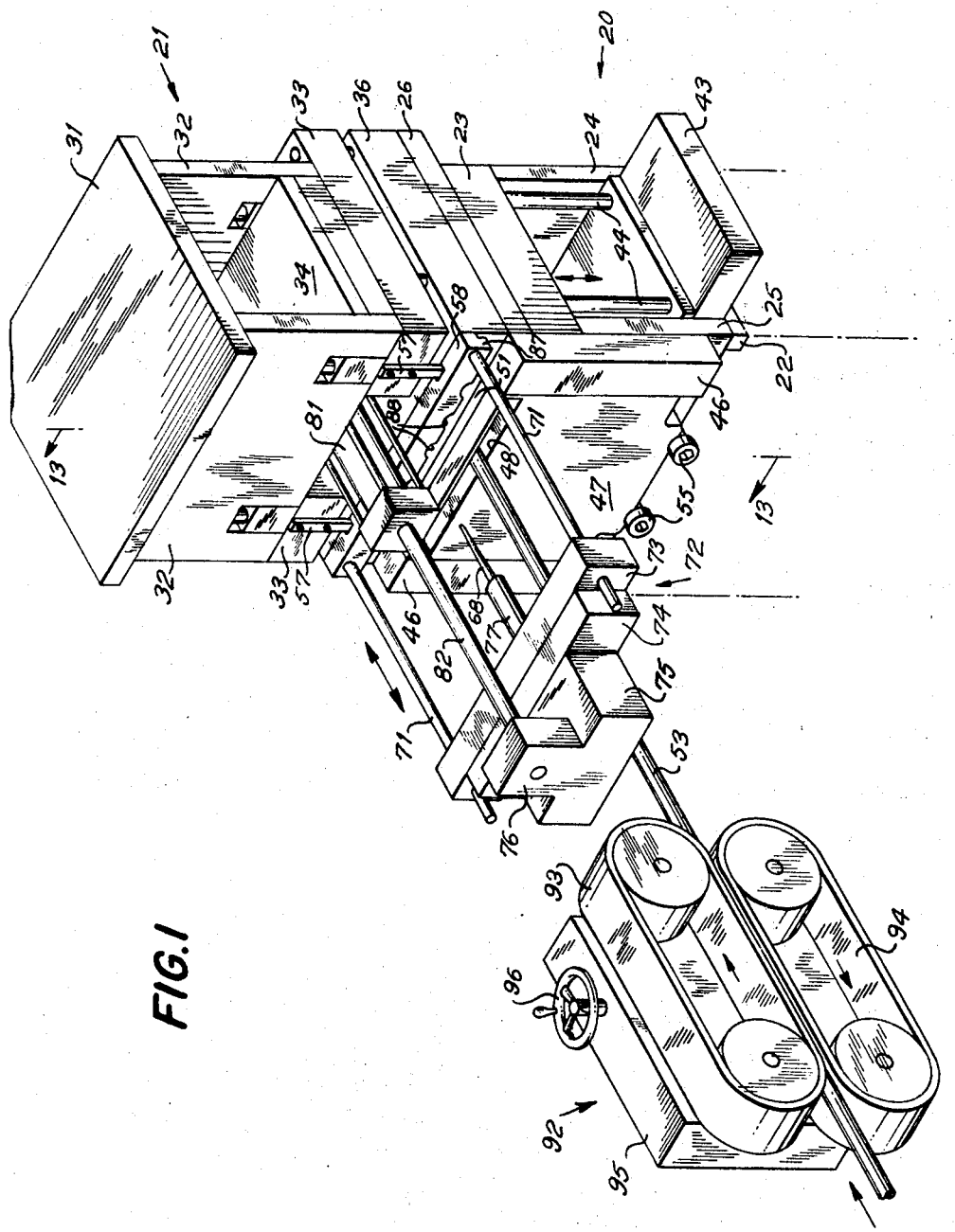
FIG. 1 is a perspective view of an illustrative apparatus according to this invention.

Referring to FIGS, 1, 13, 14, 16, and 19 the apparatus chosen to illustrate the present invention comprises generally a lower or stationary assembly 20 and an upper or movable assembly 21. The lower assembly includes a pair of horizontal bed rails 22 adapted to be mounted on the stationary bed of a conventional molding machine (not shown). Spaced above the bed rails, and parallel to them, is a stationary back-up plate 23 supported by two rear legs 24 and a front support plate 25. Supported on the back-up plate 23 is a stationary, horizontal runner plate 26 having grooves 27 of semicircular cross-section formed in its upper face (see FIG. 18). The grooves 27 communicate through a port 28 in the lower face of the runner plate, with the usual injection cylinder (not shown) of the molding machine. When a piston within the cylinder is actuated, molten plastic within the cylinder is forced into port 28.

The upper assembly 21 includes a horizontal mounting plate 31 adapted to be mounted on the part of the conventional molding machine capable of moving vertically toward and away from the machine bed. Suspended from the mounting plate 31 are two spacers 32 carrying, at their lower ends, a pair of back-up plates 33 parallel to the mounting plate and to each other. The back-up plates 33 are spaced apart to provide a channel between them. A rigidifying member 34 extends between the spacers 32 and above the back-up plates 33. Depending from the back-up plates 33, by means of large bolts 35 (see FIG. 16) is a cavity plate 36 formed with one or more cavities 37 terminating at the front face 38 of the cavity plate. In the present example six cavities are shown, but obviously more or fewer cavities may be provided as desired. Grooves 41 of semicircular cross-section (see FIG. 17), formed in the lower face of the cavity plate, communicate with each cavity 37 through a passageway 42. The grooves 41 are in mirror-image relation to the grooves 27 in the runner plate so that when the lower face of the cavity plate is brought into engagement with the upper face of the runner plate, the grooves 27 and 41 cooperate to form a passageway of circular cross-section through which molten plastic can flow from the port 28 to the passageways 42 and into the cavities 37.

Figure 13:
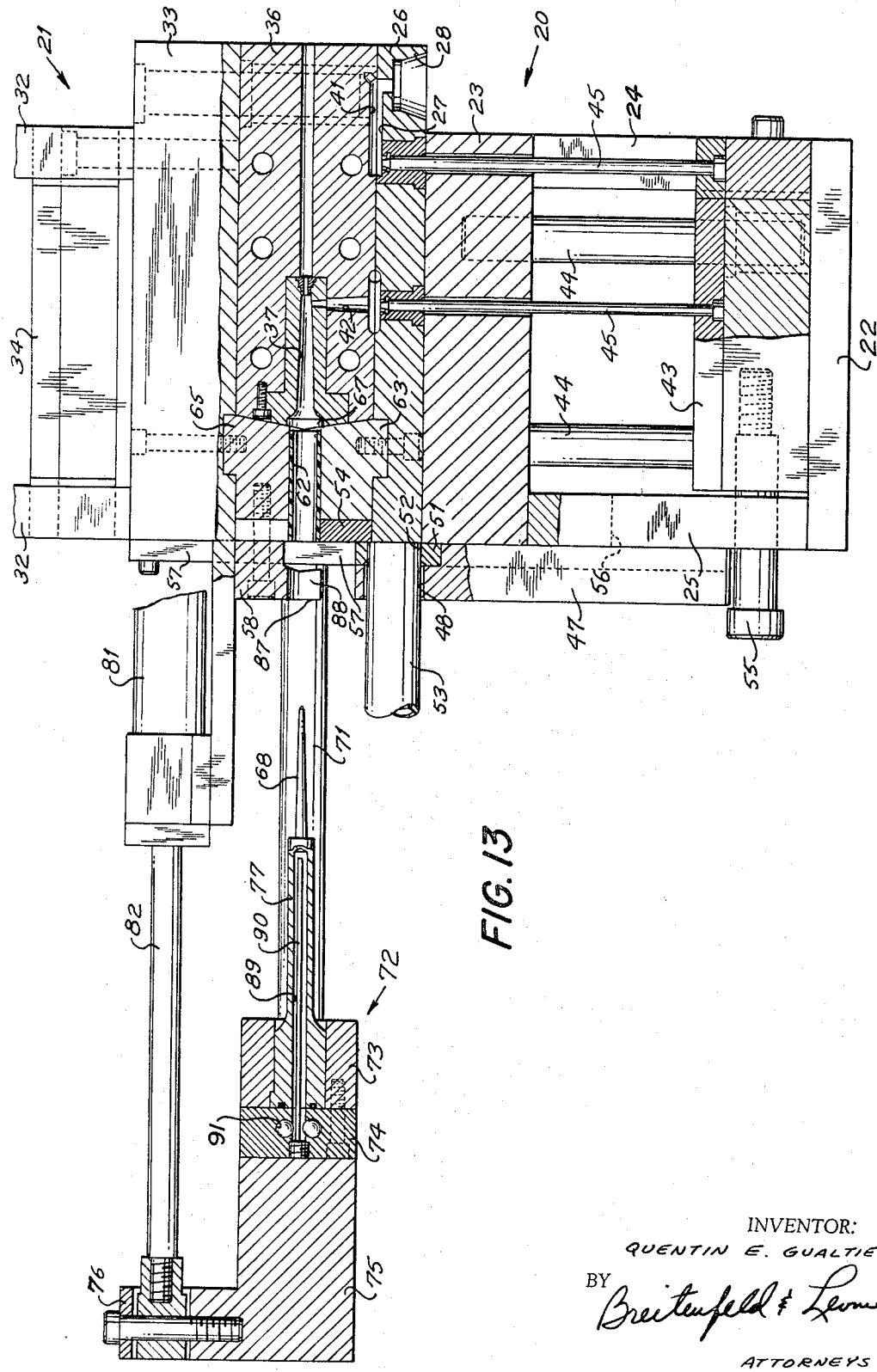
FIG. 13 is a vertical cross-sectional view taken on line 13—13 of FIG. 1.
Figure 14:
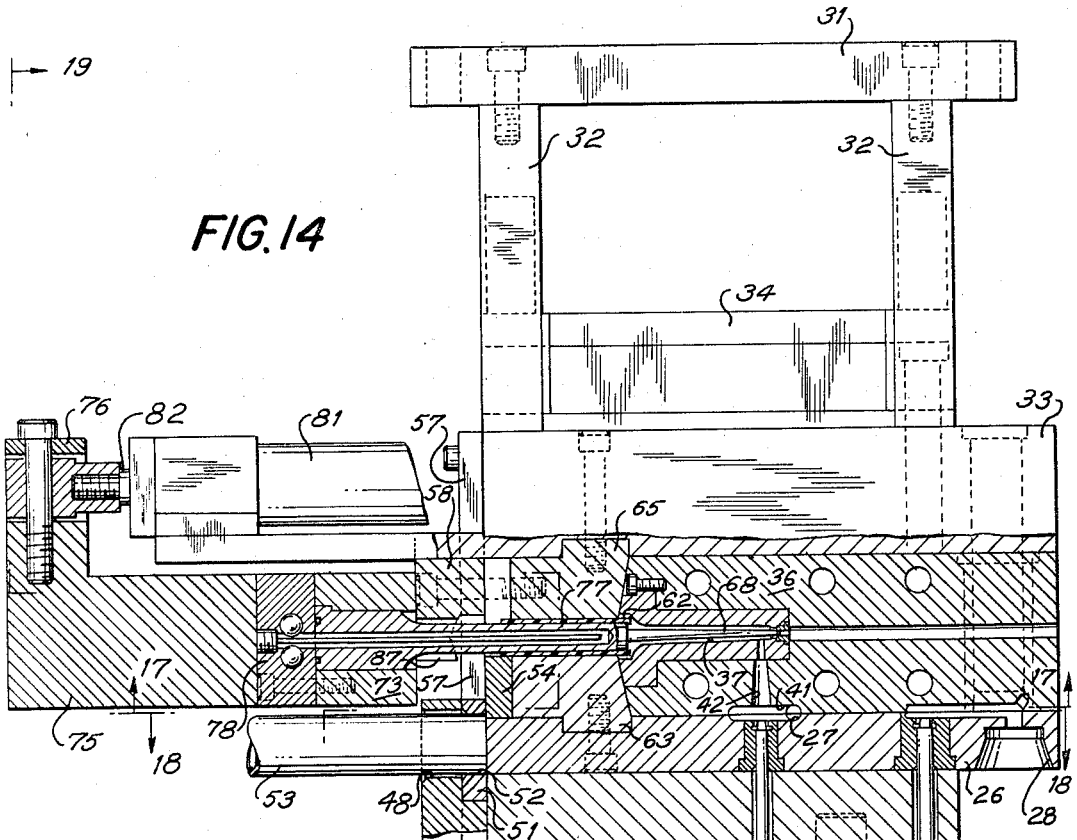
FIG. 14 is a view similar to FIG. 13 at a different stage of operation.

Arranged above the bed rails 22 and between the legs 24 and support plate 25 is an ejector plate 43 slidable vertically along stationary guides 44. The ejector plate is adapted to be moved, by a well-known part of a conventional molding machine, between a lower position shown in FIGS. 1, 13 and 14, and an upper position shown in FIG. 16. Projecting vertically upwardly from the ejector plate 43 are a series of ejector pins 45, the pins being arranged in the same vertical planes which contain the grooves 27 (see FIG. 18). Holes are provided in the back-up plate 23 and runner plate 26 for slidably accommodating the pins 45. When the ejector plate is in its lower position, the upper ends of the pins 45 are flush with the surfaces of the grooves 27. After each molding cycle is completed, the ejector plate is raised to its upper position wherein the pins 45 push the hardened plastic sprue out of the grooves 27 so that the sprue can be removed from the apparatus, such as by an air blast. The ejector plate is then immediately returned to its lower position.

Mounted on the front faces of the back-up plate 23 and front support plate 25 are two vertical, spaced-apart jibs 46, the jibs extending upwardly to the level of the upper face of the runner plate. A guide plate 47 is slidably retained between the jibs and guided by them for vertical movement. The guide plate 47 is provided near its upper edge with a horizontal elongated opening 48, the length of the opening being a little greater than the horizontal dimension occupied by all the cavities 37 (see FIG. 19). As shown clearly in FIGS. 13, 14, and 16, the rear face of the guide plate 47 is cut back along its upper edge to provide room for accommodating a movable knife blade 51 in such a way that the top and rear faces of the knife blade are flush with the corresponding faces of the guide plate. The knife blade 51 is fastened to the guide plate and moves with it. The movable knife blade is provided with a series of holes 52 in horizontal alignment with the opening 48 in the guide plate, each hole being in the same vertical plane which contains one of the cavities 37 (see FIG. 19). Each hole 52 is large enough to accommodate the tubing 53 to be headed. The movable knife blade 51 is arranged to cooperate with a stationary knife blade 54 mounted along the front edge of the runner plate 26.

For the purpose of lifting the guide plate 47 and movable knife blade 51 to their upper position (FIG. 16), preparatory to a cutting operation, a pair of pegs 55 project forwardly from the front face of the ejector plate 43. The pegs extend through vertically elongated slots 56 in support plate 25 and beneath the guide plate 47. At the end of each molding cycle, as the ejector plate 43 is raised, as described above, the pegs 55 lift the guide plate 47 from its lower position (FIGS. 13, 14, and 19) to its upper position (FIG. 16) wherein the holes 52 in the knife blade 51 are disposed above the top edge of the stationary knife blade 54. The guide plate and movable knife blade are held in their upper position by friction until they are returned to their lower position by means of a pair of fingers 47, each of which is mounted on, and projects downwardly from, the front face of one of the top back-up plates 33. The fingers 57 extend downwardly through suitable openings in the stripper bar 58 (to be described below), so that their lower ends 61 (FIG. 16) can come into engagement with the top face of the movable knife blade 51. After a length of tubing 53 has been advanced through one of the holes 52 in the knife blade 51, the upper assembly 21 is moved downwardly from the position of FIG. 16. At the end of this movement, the lower ends 61 of the fingers 57 contact the knife blade 51 and push both the knife blade and guide plate 47 down to their lower position. As the knife blade 51 moves past the stationary knife blade 54, the tubing 53 is sheared leaving an independent tube 62 to the right (in FIG. 16) of the interface between the two knife blades. The free end of the continuous length of tubing 53 is supported by the knife blade 51 and guide plate 47 during the balance of the molding cycle. In the present illustration the guide plate 47 is actuated by the pegs 55 and fingers 57. However, if desired, a pneumatic or hydraulic piston-cylinder device (not shown) could be employed to move the guide plate in timed relation to the operation of the mold apparatus.

Fixed to the runner plate 26 just behind the stationary knife blade 54, is a stationary clamp jaw 63. The upper face of the jaw 63 is formed with six semi-elliptical depressions 64 (see FIGS. 18 and 19) each depression being in vertical alignment with one of the cavities 37. The depressions 64 are semi-elliptical because the headed containers of the present illustration are elliptical in cross-section, and the depressions are made to correspond to the shape of the lower half of the finished container. Depending from the lower faces of the top back-up plates 33 is a movable clamp jaw 65 located directly above the stationary jaw 63. The lower face of the jaw 65 is formed with semi-elliptical depressions 66 (see FIGS. 17 and 19) arranged to cooperate with the depressions 64, when the jaws are in engagement, to form elliptical spaces between the jaws.

It should be mentioned that as the upper assembly 21 is being lowered toward the lower assembly, a space exists between the cavity plate 36 and the back-up plates 33 (see FIG. 16). The first contact between the assemblies 20 and 21 occurs when the lower face of the cavity plate 36 meets the upper face of the runner plate 26. At this point, the cavity plate has reached its lowermost position; however, the remainder of the upper assembly 21 continues to move downwardly as the bolts 35 slide vertically with respect to the cavity plate. This final stage of the upper assembly movement terminates when the jaws 63 and 65 engage each other. During the final stage of movement, just referred to, two operations take place simultaneously, namely, the tubing 53 is sheared as the fingers 57 move the guide plate downwardly, and the resulting tube 62 is clamped between the jaws 63 and 65.

Figure 15:
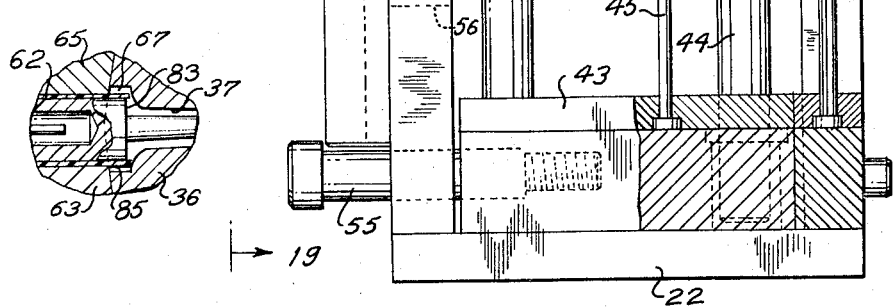
FIG. 15 is a fragmentary cross-sectional view showing the mouth of the mold cavity.

The jaws 63 and 65 perform two functions. First, they force the tube 62 into a cross-sectional shape corresponding to the shape of the mouth 67 (see FIG. 15) of the cavity 37 preparatory to the core 68 (to be described below) being moved through the tube. In the present example, the tubing 53 has a circular cross-section and the jaws cause the tubes 62 cut from the tubing to assume an elliptical cross-section. Secondly, the rear faces of the jaws 63 and 65 are inclined to conform to the dual-inclined front face 38 of the cavity plate 36. Consequently, the jaws not only tightly surround the tube 62 but they also fit tightly against the face 38, and thereby serve to close the front end of the cavity 37 before molten plastic material is forced into the cavity.

Projecting forwardly from the cavity plate 36, through suitable openings in the stripper bar 58 (to be described below) are a pair of horizontal rails 71. Slidably mounted on the rails 71, for movement toward and away from the cavity plate, is a carriage 72. The carriage comprises a cross-bar 73 provided with holes near its ends for slidably accommodating the rails 71. Mounted on the front face of the cross-bar is a cooling-fluid manifold 74, and mounted on the front face of the manifold is a block 75 having an upstanding head 76. Projecting rearwardly from the cross-bar is a stem 77 presenting the core 58 at its rearward end. For the sake of simplicity, only one stem and core are shown. However, it is understood that actually a stem and core for use with each cavity 37 projects from the cross-bar 73. A hydraulic piston-cylinder device 81, mounted on the upper face of the cavity plate 36 in the channel between the backup plates 33, includes a piston rod 82 connected to the head 76. Therefore, movement of the piston within the cylinder of device 81 is transmitted to the carriage 72 via the piston rod 82.

For the purpose of cooling the stem 77 and core 58, the stem is formed with a central longitudinal bore 89 (FIG. 13) containing a longitudinal baffle 90 which divides the bore into two passageways connected at their rearward ends. The passageways communicate at their forward ends, with two conduits 91 formed in the manifold 74. By suitable means (not shown) cooling fluid is caused to flow through one of the conduits 91, through the passageways in the stem 77, and out through the other conduit 91.

The length of the core 68 is a little less than the length of the cavity 37 so that the entire core as well as the rear end 83 (FIG. 15) of the stem 77 can enter the cavity. The internal contour of the cavity 37 and the exterior contour of the core are, of course, appropriately formed to produce molded plastic caps 84 (FIG. 16) of desired contour on the finished containers. The stem 77 has a cross-sectional shape (see FIG. 19) conforming closely to the final shape of the tube 62, i.e. the shape the tube is caused to assume by the clamping jaws 63 and 65. Thus, the stem 77 fits very snugly within the tube and supports the tube wall against the inward pressure exerted by the clamping jaws. The mouth 67 of the cavity has the same cross-sectional shape as the stem 77, but is somewhat larger, so that an annular region 85 (FIG. 15) is present around the end of the tube 62 located within the cavity mouth. The region 85 causes the cap 84 to be formed with a collar 86 having a larger diameter than the tube 62.

The collar 86 is used by the stripper plate 58 to remove finished containers from the stem 77. The stripper plate 58 is mounted on the front face of the movable jaw 65 and has a downwardly projecting lip 87 spaced from the jaw. The lip 87 is arranged in the horizontal path of movement of the core 68 and stem 77, but the lower edge of the lip is formed with semi-elliptical cut-outs 88 (see FIGS. 1 and 17) which permit their respective cores and stems to move past the lip 87 into and out of the cavities 37. However, the stem passes very close to the surface of the cut-out 88. As the core 68 is withdrawn from the cavity 37, the finished container 62, 84 is carried with it due to the snug fit of the tube 62 on the stem 77. The tube passes through the cut-out 88 in stripper bar lip 87. However, due to its larger size, the collar 86 of the cap 84 abuts against the lip and the container is prevented from moving forwardly any further. Continued forward movement of the stem and core, therefore, causes the container to be slipped off the stem and core (FIG. 16) whereupon it drops on to a suitable collecting mechanism (not shown) of any well known type. For example, the collecting mechanism may be a tray which moves between the upper and lower assemblies to catch the finished container and deliver it to a collecting station, and then withdraws before the assemblies come together again.

A complete cycle of operation of the illustrated apparatus will now be described. The continuous length of tubing is advanced toward the molding apparatus by a feeding device 92 (FIG. 1). This feeding device is intended to be illustrative of any well known type of feeding means, and includes a pair of belts 93 and 94, of friction material, adapted to be driven in synchronism in the direction of the arrows by means within the box 95. A handwheel 96 permits adjustment of the spacing between the belts so that they can accommodate tubing of various diameters. Suitable electromechanical means are provided for causing the belts 93 and 94 to move intermittently, i.e. once during each cycle of operation of the apparatus, each movement lasting for a predetermined period of time so that a predetermined length of tubing is advanced during each movement of the belts. The tubing may be fed from a supply reel (not shown) or directly from the extruding machine which produces it. For the sake of simplicity, only one length of tubing 53 is shown in the drawings. However, it is to be understood that in practice, as many lengths of tubing 53 as there are cavities 37 are advanced simultaneously by the feeding device 92.

At the beginning of a cycle, the upper assembly 21 is spaced above the lower assembly 20, as shown in FIGS. 16 and 2, and the guide plate 47 is in its upper position. For the sake of convenience, the spacing shown between the assemblies in FIGS. 2, 3, 7, and 8 is proportionally smaller than it is in actuality. Referring to FIG. 2, the free end 97 is led, in the direction of the arrow, into the hole 52 in the movable knife blade 51 so that the free end 97 is flush with the rear face of the knife blade. If a cycle of operation has already occurred, the free end of the tubing 53 will be in this position (see FIG. 16). The cycle begins by actuation of the feeding device 92 to move a predetermined length of tubing, equal to the length of the tubular part of the finished container, past the interface between the knife blades 51 and 54 (see FIG. 3) and into the depression 64 in the lower jaw 63. The upper assembly then moves downwardly to the position shown in FIGS. 13 and 4, wherein the cavity plate 36 contacts the runner plate 26, the fingers 57 move the guide plate 47 and knife blade 51 to their lower position thereby severing an independent tube 62 from the tubing 53, and the jaws 65 and 63 meet to press the tube 62 into an elliptical shape.

Figure 6:
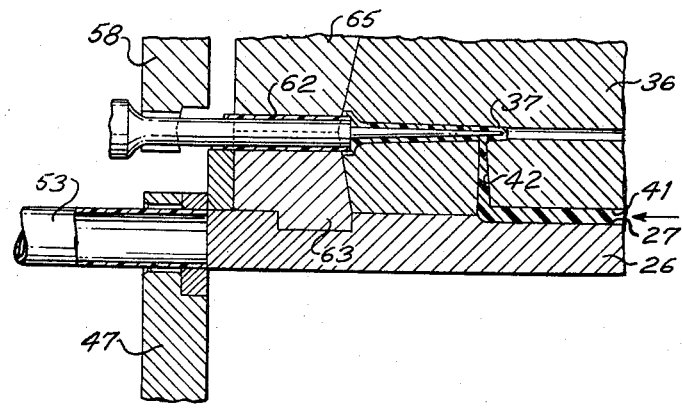
Figure 7:
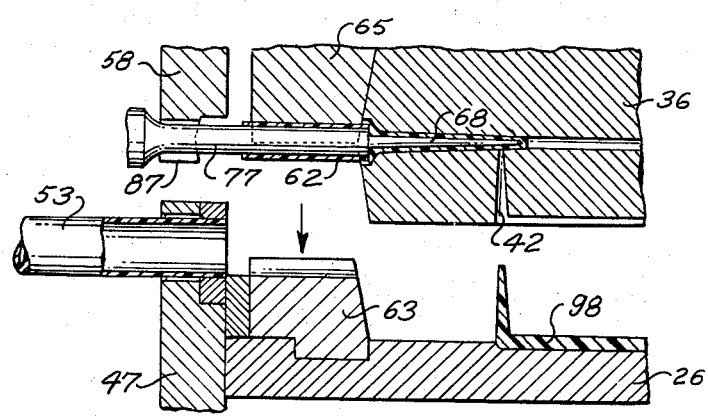
Figure 8:
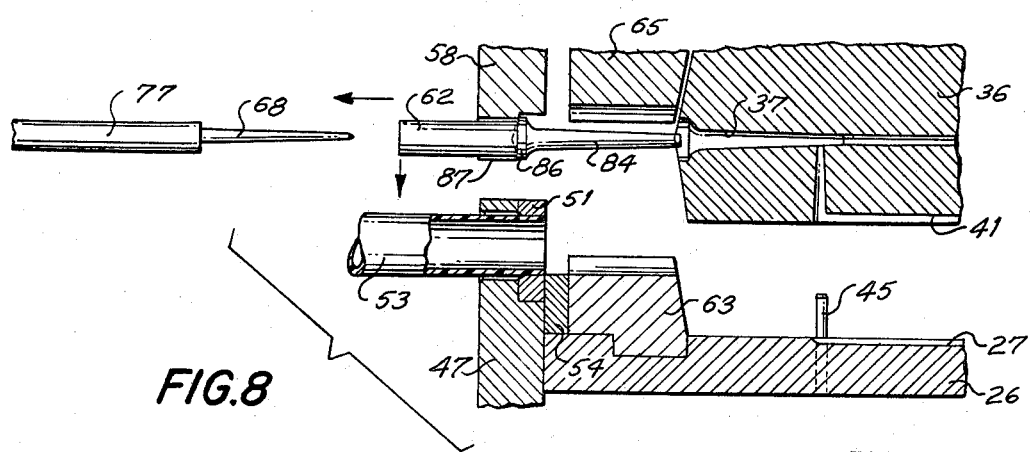

The carriage 72 is now actuated to move the core 68 and stem 77 into the newly-cut forward end of the tube 62. The core 68 passes freely through the tube, but since the stem 77 fits snugly within the tube, it causes the tube to move rearwardly a short distance until the rear end of the tube strikes the walls of the cavity (see FIG. 15) rearwardly of the cavity mouth 67. The core and stem then complete their movement to bring them to the position shown in FIGS. 14 and 5. At this point, the molding machine is operated to force molten plastic material, in the direction of the arrows in FIG. 6, through the runner passageways formed by the grooves 27 and 41 and up the passageway 42 into the cavity 37. The upper assembly 21 is then lifted away from the lower assembly as shown in FIG. 7, leaving a plastic sprue 98 in the groove 27. Thereafter, as shown in FIGS. 8 and 16, the core 68 is withdrawn from the cavity 37, and as the tube 62 moves with it and the stem 77, the collar 86 of the newly-formed cap 84 strikes the lip 87 of the stripper bar 58 and the container is stripped from the core and stem. At the same time, the ejector plate 43 is raised to cause the ejector pins 45 to push the sprue 98 out of the groove 27, and to lift the guide plate 47 to its upper position. The apparatus is now prepared for the beginning of the next cycle of operation.

Figure 9:
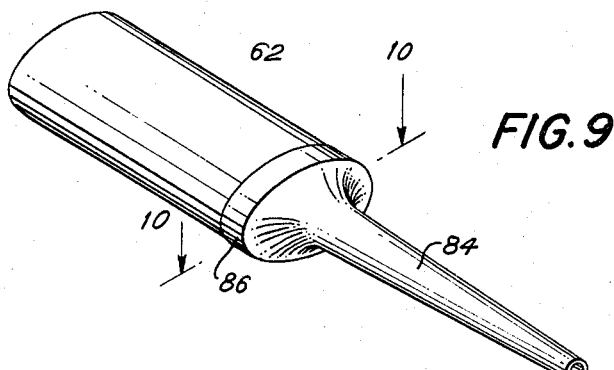
FIG. 9 is a perspective view of an illustrative container according to this invention, before being filled with a product.
Figure 12:
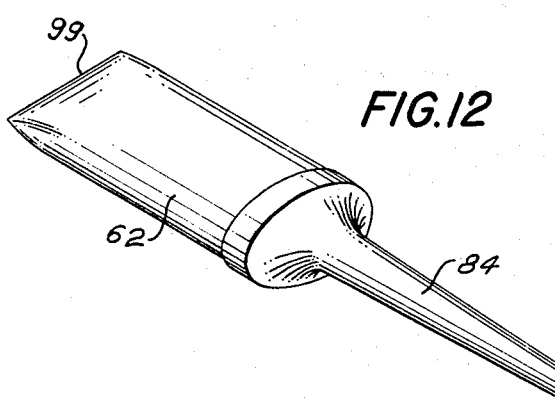
FIG. 12 is a perspective view of the container after being filled and sealed.

An example of the container which may be produced by the apparatus described above is shown in detail in FIGS. 9-12. FIG. 9 illustrates the unfilled container as it is produced by the apparatus. Ultimately, the container is filled with a liquid or semi-liquid product through the end of the tube 62 opposite the cap 84, and sealed along a line 99 to produce a filled container as shown in FIG. 12. A suitable closure, not shown, is provided for the open end of the cap 84.

Figure 10:
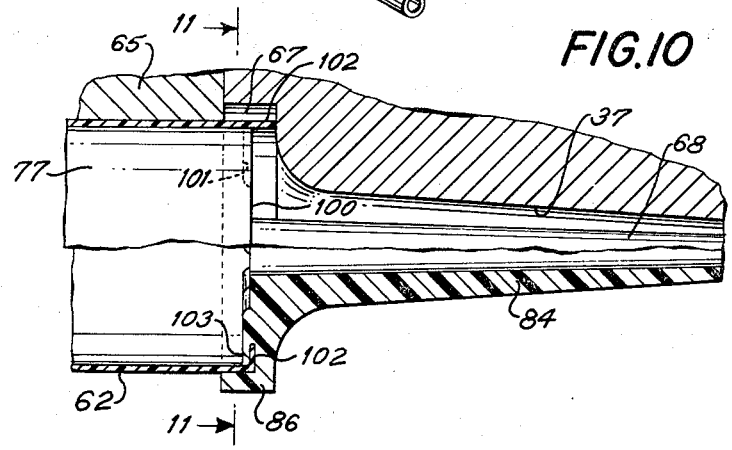
FIG. 10 is a cross-sectional view taken on line 10—10 of FIG. 9.
Figure 11:
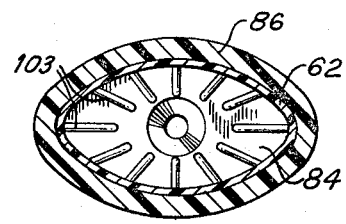
FIG. 11 is a cross-sectional view taken on line 11—11 of FIG. 10.

In conventional practice, the temperature of the molten plastic material injected into the cavity 37 is sufficient to melt the end of the tube 62 located in the cavity mouth 67 (FIG. 10). Thus, the molten plastic material and the tube material fuse to form a bond between them. The apparatus described above can, of course, operate in this way. However, according to the invention, the injected plastic material and the end of the tube 62 need not fuse in order for a secure connection to be formed between the tube and the cap 84. The end face 100 of the stem 77, from which the core 68 projects, is formed with a series of depressions 101 which extend radially outwardly to the edge of the face 100. Furthermore, the movement of the core 68 into the cavity 37 terminates before the end face 100 of the stem 77 reaches the end edge of the tube 62, resulting in a short portion 102 of the tube overhanging the end face 100. The molten plastic material is injected into the cavity 37 with a velocity sufficient to deform the portion 102 of the tube, as indicated in the lower half of FIG. 10, but need not have a temperature sufficient to melt the tube material.

The molten plastic flows into the depressions 101 to form projections or ridges 103 (FIGS. 10 and 11), the deformed region of the tube portion 102 being sandwiched between the ridges 103 and the remainder of the collar 86 of the cap. Consequently, a strong attachment is effected between the tube and cap. Since no fusion between cap and tube is necessary, tubes made of materials having relatively high melting points may be conveniently used without requiring that the molten plastic material be brought to a temperature above that needed to melt it.

It should be pointed out that the apparatus described above lends itself admirably to use with an "in line" device, i.e. a device aligned with the molding apparatus 20, 21 and the feeder 92, for decorating the tubing 53. Any of a number of types of conventional imprinting or decorating devices (not shown) may be employed to place a desired imprint, which is to appear on the finished container, on the tubing 53 during its stationary periods between intermittent advancements. The decorating device can be located either between the feeder and the molding apparatus, or at the opposite end of the feeder so that it operates on the tubing before it is engaged by the feeder. Once the decorating device has been properly positioned, no problem of registry of the printed matter with the tubes 62 cut from the tubing 53 is present since the feeder 92 advances the same predetermined length of tubing during each of its intermittent movements.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

What is claimed is:

1. An apparatus for producing a tubular container having a hollow molded plastic cap at one end, comprising
    (a) a mold formed with a cavity having a mouth, the cavity defining the outer contour of the cap,
    (b) means for injecting molten plastic into the cavity,
    (c) means for advancing a continuous length of tubing to bring the free end of the tubing to the cavity mouth,
    (d) means spaced from the cavity mouth for cutting the tubing to produce an independent tube having one end at the cavity mouth,
    (e) a core located on the side of said cutting means opposite to said mold, said core defining the inner contour of the cap, and
    (f) means for moving said core through the independent tube and into the cavity prior to the injection of molten plastic into the cavity.

2. An apparatus as defined in claim 1 wherein the dimensions of the cavity mouth are greater than the corresponding outer dimensions of said tube whereby on annular space is present betwen said tube and the cavity mouth, and including jaws for engaging the entire circumference of said tube at a point immediately adjacent to the cavity mouth in order to close said annular space.

3. An apparatus as defined in claim 2 wherein said core is provided with a stem adapted to fit snugly within said tube and maintain the latter is contact with said jaws during the molding operation.

4. An apparatus as defined in claim 3 wherein said stem has an end face from which said core projects, said end face being located inside the cavity mouth during the molding operation, and said end face having depressions in its surface extruding to the outer edge of the said face, the depressions causing projections to be formed in the cap for gripping said one end of said tube.

5. An apparatus as defined in claim 3 wherein said core-moving means withdraws said core from the cavity after completion of the molding operation, said core frictionally carrying the tube and attached cap with it, and said annular space causes the cap to be formed with a collar part having a diameter larger than the diameter of the tube, and including a stripper bar spaced from the cavity mouth and arranged out of the path of withdrawing movement of said tube but in the path of movement of said collar part whereby said collar part strikes said stripper bar and removes the tube from said stem and core as the latter continue their withdrawing movement.

6. An apparatus as defined in claim 1 wherein said cutting means comprises a stationary blade on one side of the path of advancement of the tubing, a movable blade having a hole, the tubing passing through the hole during its advancement to said cavity, and means for moving said movable blade toward said stationary blade, the tubing being cut as the hole moves past said stationary blade.

7. An apparatus for producing a tubular container having a hollow molded plastic cap at one end, comprising
    (a) a stationary horizontal runner plate,
    (b) a cavity plate above said runner plate and movable vertically toward and away from said runner plate,
    (c) a cavity in said cavity plate terminating at one face of said cavity plate in a mouth, the cavity defining the outer contour of the cap,
    (d) a guide plate movable vertically with respect to said runner plate,
    (e) a movable knife blade carried by said guide plate, said knife blade having a hole which is aligned with said cavity when said guide plate is in its uppermost position, said hole being adapted to accommodate a continuous length of tubing which is moved through the hole to bring its free end to the mouth of said cavity,
    (f) a knife blade stationary with respect to said runner plate located directly adjacent to said movable knife blade and below the hole therein when said guide plate is in its uppermost position, and
    (g) means movable with said cavity plate for moving said guide plate downwardly, when said cavity plate moves into engagement with said runner plate, in order to move said movable knife blade past said stationary knife blade and cut an independent tube off the continuous length of tubing.

8. An apparatus as defined in claim 7 including means movable vertically with respect to said runner plate for returning said guide plate to its uppermost position after completion of each molding cycle.

9. An apparatus as defined in claim 7 including a jaw stationary with respect to said runner plate, and a complementary jaw above said stationary jaw, said complementary jaw being movable with said cavity plate toward and away from said stationary jaw, said jaws holding the independent tube between them during the cap-molding operation.

10. An apparatus as defined in claim 7 including a core movable vertically with said cavity plate, said core being aligned with said cavity, and means for moving said core horizontally into said cavity after said cavity plate reaches its lowermost position.

11. An apparatus as defined in claim 10 wherein said core-moving means includes at least one rail extending horizontally from said cavity plate, a carriage slidably mounted on said rail, said core projecting from said carriage toward said cavity, and means for moving said carriage along said rail to insert said core into and withdraw it from said cavity.

References Cited
UNITED STATES PATENTS

| | | | |
|---|---|---|---|
| 2,777,164 | 1/1957 | Strahm | 18—30 |
| 2,812,548 | 11/1957 | Qiunche et al. | 18—30 X |
| 2,936,481 | 5/1960 | Wilkalus et al. | 18—5 |
| 3,078,517 | 2/1963 | Makowske | 18—30 X |
| 3,142,089 | 7/1964 | Wilkalus et al. | 18—5 |
| 3,207,833 | 9/1965 | O'Errico. | |

WILLIAM J. STEPHENSON, *Primary Examiner.*